United States Patent [19]

della Faille d'Huysse et al.

[11] Patent Number: 4,645,612

[45] Date of Patent: Feb. 24, 1987

[54] COMPOSITION BASED ON CALCIUM CHLORIDE HEXAHYDRATE FOR STORING HEAT USING A PHASE CHANGE AND PROCESS FOR ITS PREPARATION

[75] Inventors: Gaétan della Faille d'Huysse, Brussels; Louis Boxus, SINT-Stevens-Woluwe, both of Belgium

[73] Assignee: Solvay & Cie. (Societe Anonyme), Brussels, Belgium

[21] Appl. No.: 766,417

[22] Filed: Aug. 16, 1985

[30] Foreign Application Priority Data

Aug. 27, 1984 [FR] France .................. 84 13329

[51] Int. Cl.$^4$ .............................................. C09K 5/06
[52] U.S. Cl. ...................................................... 252/70
[58] Field of Search ........................................ 252/70

[56] References Cited

U.S. PATENT DOCUMENTS

| | | | |
|---|---|---|---|
| 3,719,225 | 3/1973 | Mekjean et al. | 252/70 |
| 3,986,969 | 10/1976 | Telkas | 252/70 |
| 4,412,931 | 11/1983 | Lane et al. | 252/70 |
| 4,540,502 | 9/1985 | Kimura | 252/70 |

FOREIGN PATENT DOCUMENTS

| | | | |
|---|---|---|---|
| 149373 | 11/1980 | Japan | 252/70 |
| 109578 | 6/1984 | Japan | 252/70 |

OTHER PUBLICATIONS

Meisingset et al., "Latent Heat Storage in Salt Hydrates", Presented at Conference.
"Solar Energy Benefits Evaluated-Techniques and Results", Birmingham, 1982.

*Primary Examiner*—Robert A. Wax
*Attorney, Agent, or Firm*—Spencer & Frank

[57] ABSTRACT

The composition contains, relative to the weight of calcium chloride, from 2 to 15% by weight of a potassium nitrogen compound and from 2 to 15% by weight of ammonium chloride, the weight relationship between the potassium nitrogen compound and ammonium chloride being preferably between 0.4 and 2. The composition, which has a melting point of 19 to 22° C. is suitable, in particular, for heat conditioning of dwellings and of covered cultivation installations.

7 Claims, No Drawings

COMPOSITION BASED ON CALCIUM CHLORIDE HEXAHYDRATE FOR STORING HEAT USING A PHASE CHANGE AND PROCESS FOR ITS PREPARATION

BACKGROUND OF THE INVENTION

1. Field of the Invention

The present invention relates to a composition based on calcium chloride hexahydrate for storing heat using a phase change, the efficiency range of which is below 23° C. and which is suitable, consequently, particularly for recovering heat energy in dwellings and in covered cultivation installations such as greenhouses, and the process for the preparation of such a composition.

2. Background of the Art

In view particularly of its advantageous price and its high capacity for storing heat using a phase change, calcium chloride hexahydrate has already frequently been proposed as a basic component of heat storage compositions. However, since the melting point of calcium chloride hexahydrate is in the region of 29° C., the compositions proposed hitherto are found not to be ideal for heat conditioning of dwellings and covered cultivation installations in which it is generally desired to maintain a temperature of 17° to 23° C. and, preferably, from 19° to 22° C.

To lower the melting point of the heat storage compositions based on calcium chloride hexahydrate, it has already been proposed by K. K. Meissingset and F. Grondvold, in the course of conferences held at Birmingham on 9 and 10 Sept. 1982 in connection with the storage of solar energy, to incorporate potassium chloride and/or ammonium chloride in these compositions. However, according to the tests described by these investigators, it appears that these additives do not make it possible to lower the melting point of the compositions beyond 23° C. and thus make them perfectly efficient for use in dwellings and in greenhouses for cultivation.

It is possible to lower the melting point of a composition by adding a slight excess of water to it. This method, however, has the disadvantage of reducing the heat storage capacity and of considerably widening the temperature interval separating the beginning and the end of melting. This widening of the melting range further decreases the useful storage capacity, because the permissible temperature variations, particularly in the case of agricultural greenhouses, are only of a few degrees.

SUMMARY OF THE INVENTION

The present invention consequently concerns chiefly a composition based on calcium chloride hexahydrate for storing heat using a phase change whose efficiency range is below 23° C. and particularly between 17° and 22° C. and having a melting range which is as narrow as possible.

The invention consequently concerns a composition based on calcium chloride hexahydrate for storing heat using a phase change which is characterized in that it contains, relative to the weight of anhydrous calcium chloride, from 2 to 15% by weight of a potassium nitrogen compound and from 2 to 15% by weight of ammonium chloride.

The calcium chloride hexahydrate employed in the composition according to the invention can be of any origin. It is preferred, however, to use calcium chloride hexahydrate prepared from industrial calcium chloride and particularly from calcium chloride obtained as a by-product in the Solvay process for producing sodium carbonate. It appears, in fact, that this industrial calcium chloride contains certain impurities which can, in particular, have a favourable effect on the supercooling phenomenon.

The potassium nitrogen compound may be either potassium nitrite or potassium nitrate, the latter being preferred. The nitrogen compound, as well as ammonium chloride, may also be of industrial grade.

Preferably, the weight relationship between the quantities of potassium nitrogen compound and ammonium chloride which are incorporated in the compositions according to the invention varies between 0.4 and 2.

In the composition according to the invention it is possible advantageously to incorporate, in addition, known nucleating agents, the function of which is to reduce or eliminate any undesirable supercooling phenomenon and/or thickening agents the effect of which is to inhibit any incongruous melting phenomenon.

As nucleating agents, mention can be made, among others, of calcium hydroxide and barium and strontium carbonates, chlorides and fluorides, which may be in the form of hydrates. Effective thickening agents consist of cellulose derivatives, silica gel and, in particular, diatomites having a void index greater than 5, as described in the Patent Application FR-A-2,457,230, filed in the name of Anvar.

In the composition according to the invention, the chief component responsible for the absorption, storage and recovery of heat using a phase change is calcium chloride crystallizing in the hexahydrated form. However, for storage and transport facilities, as described in Patent Application 82/03,100, filed on Feb. 23, 1982 in the name of the Applicant company, it is permissible to produce the composition according to the invention by incorporating calcium chloride in an anydrous, mono- and/or dihydrated form and, in these cases, to subsequently incorporate the water necessary to permit crystallization of calcium chloride in the hexahydrated form at the place of use during the actual utilization of the composition.

The invention also concerns a process for producing a composition based on calcium chloride hexahydrate for storing heat using a phase change, which consists in incorporating in this composition, relative to the weight of anhydrous calcium chloride, from 2 to 15% by weight of a potassium nitrogen compound and from 2 to 15% by weight of ammonium chloride.

According to a first embodiment of the composition according to the invention, in a first step, an aqueous solution of calcium chloride is produced in which the quantity of water present corresponds to the quantity necessary for the calcium chloride to crystallize in the hexahydrated form, this solution being maintained at a temperature which is at least 30° C. to prevent the crystallization of calcium chloride in the hexahydrated form. Then, in a second step, there are added to this solution the required quantities of a potassium nitrogen compound and of ammonium chloride and, if appropriate, the other desired additives such as nucleating agents and/or thickening agents, while the mixture is subjected to continuous stirring, the temperature being maintained at at least 30° C. to prevent setting through crystallization of the calcium chloride in a hexahydrated form.

The pasty mixture can then be packed in suitable impervious packages and be stored or despatched to its place of use.

According to a second embodiment of the composition according to the invention, anhydrous, mono- and/or dihydrated calcium chloride and the required quantities of a potassium nitrogen compound, of ammonium chloride and, if appropriate, of the other additives are introduced into this mixer; the various components being in the form of particles with a mean diameter below 0.5 mm, the homogenous ous mixture thus produced being then packed in impervious packages with a view to its despatch to the site of use. In this latter case, the composition according to the invention is produced at the site of use by incorporating in the mixture the quantity of water required to permit all the calcium chloride to crystallize in the hexahydrated form. When the calcium chloride employed is, according to the preferred embodiment, industrial calcium chloride, it is in form of flakes which need merely be ground to produce particles of a suitable average diameter, or in the form of dust produced in the flake manufacturing plant, the dust particles already having the required size in this case.

DESCRIPTION OF THE PREFERRED EMBODIMENT

The composition according to the invention is additionally illustrated by the practical example of embodiment, given below.

EXAMPLE 457 g of anhydrous calcium chloride, followed gradually by 449 g of water, are introduced into a paddle mixer maintained at 35° C., to form a calcium chloride solution. 43 g of potassium nitrate and 51 g of ammonium chloride are then incorporated in this solution, maintained at 35° C.

A sample of the solution thus produced is taken and is cooled to −40° C. in order to cause its setting due to crystallization of calcium chloride in hexahydrated form. The melting temperature of the sampler is then determined by using a differential calorimeter in which the sample is heated at a rate of 0.1° C. per minute. It is found that the melting temperature of the sample is 20.4° C. and that 80% of the heat of melting is absorbed between 17° and 21.5° C.

We claim:

1. A composition based on calcium chloride hexahydrate for storing heat using a phase change, characterised in that it contains, relative to the weight of anhydrous calcium chloride, from 2 to 15% by weight of a potassium nitrogen compound selected from the group consisting of potassium nitrate, potassium nitrate, and mixtures thereof, and from 2 to 15% by weight of ammonium chloride.

2. A composition according to claim 1, characterised in that the potassium nitrogen compound is potassium nitrate.

3. A composition according to claim 1, characterised in that the weight relationship between the quantities of the potassium nitrogen compound and ammonium chloride which are incorporated in the composition is between 0.4 and 2.

4. A composition according to claim 1, characterised in that the composition additionally contains at least one of a nucleating agent and a thickening agent.

5. A process for producing a composition based on calcium chloride hexahydrate for storing heat using a phase change, the process comprising: incorporating into said composition, relative to the weight of anhydrous calcium chloride, from 2 to 15% by weight of a potassium nitrogen compound selected from the group consisting of potassium nitrate, potassium nitrite, and mixtures thereof, and from 2 to 15% by weight of ammonium chloride.

6. A process for producing a composition based on calcium chloride hexahydrate for storing heat using a phase change, the process comprising:

producing an aqueous calcium chloride solution in which the quantity of water present corresponds to the quantity necessary for the crystallization of calcium chloride into the hexahydrated form maintaining the solution at at least 30° C., and incorporating into the solution, relative to the weight of anhydrous chloride, from 2 to 15% by weight of a potassium nitrogen compound selected from the group consisting of potassium nitrite, potassium nitrate, and mixtures thereof, and from 2 to 15% by weight of ammonium chloride while subjecting the solution to continuous stirring to produce a pasty mixture; and packing the pasty mixture in impervious packages.

7. The process according to claim 5, wherein calcium chloride and the required quantities of a potassium nitrogen compound and of ammonium chloride are incorporated into the composition by introducing same into a mixer, the various components being in the form of particles with a mean diameter below 0.5 mm, and mixing to obtain a mixture; packing the mixture in impervious packages; and incorporating in the mixture at the site of utilization a quantity of water necessary to permit the total crystallization of the calcium chloride into the hexahydrated form.

* * * * *